(12) United States Patent
Martin

(10) Patent No.: US 10,124,698 B2
(45) Date of Patent: Nov. 13, 2018

(54) OPERATING STRATEGY FOR AN ELECTRICALLY DRIVEN ALL-WHEEL-DRIVE VEHICLE

(71) Applicant: MAGNA STEYR Fahrzeugtechnik AG & Co KG, Graz (AT)

(72) Inventor: Michael Martin, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 54 days.

(21) Appl. No.: 15/243,259

(22) Filed: Aug. 22, 2016

(65) Prior Publication Data
US 2017/0050536 A1 Feb. 23, 2017

(30) Foreign Application Priority Data

Aug. 21, 2015 (EP) ...................................... 15181983
Apr. 27, 2016 (EP) ...................................... 16167305

(51) Int. Cl.
*B60L 15/20* (2006.01)
*B60K 1/02* (2006.01)
(Continued)

(52) U.S. Cl.
CPC ............ *B60L 15/2045* (2013.01); *B60K 1/02* (2013.01); *B60K 17/356* (2013.01); *B60W 10/08* (2013.01); *B60W 10/10* (2013.01); *B60W 30/188* (2013.01); *B60K 2001/001* (2013.01); *B60L 2240/12* (2013.01); *B60L 2240/423* (2013.01);
(Continued)

(58) Field of Classification Search
USPC .......................................................... 701/22
See application file for complete search history.

(56) References Cited

U.S. PATENT DOCUMENTS 5,549,172 A * 8/1996 Mutoh .................... B60L 11/18
180/65.1
6,157,885 A * 12/2000 Sakaguchi ............ B60W 10/06
477/46

(Continued)

FOREIGN PATENT DOCUMENTS

CN 102452327 A 5/2012
DE 102010020906 A1 11/2011
(Continued)

OTHER PUBLICATIONS

Office Action for Chinese Patent Application No. 201610656788.0, dated Jul. 30, 2018, 9 pages including 5 pages of English translation.

*Primary Examiner* — Jonathan L Sample
(74) *Attorney, Agent, or Firm* — Jordan IP Law, LLC; Todd A. Vaughn

(57) ABSTRACT

A method for operating a vehicle, and a vehicle having at least one first electric motor, at least one second electric motor, a front axle to be driven by the at least one first electric motor, a rear axle to be driven by the at least one second electric motor. The at least one first electric motor and the at least one second electric motor are controlled to operate using a torque which is dependent upon a characteristic map that defines areas which are delimited depending on a driver-requested torque and a vehicle speed, which areas have torque distributions for the at least one first electric motor and the at least one second electric motor.

13 Claims, 18 Drawing Sheets

(51) Int. Cl.
  *B60K 17/356* (2006.01)
  *B60W 10/08* (2006.01)
  *B60W 30/188* (2012.01)
  *B60W 10/10* (2012.01)
  *B60W 50/00* (2006.01)
  *B60K 1/00* (2006.01)

(52) U.S. Cl.
  CPC ....... *B60L 2250/26* (2013.01); *B60L 2260/28* (2013.01); *B60L 2260/50* (2013.01); *B60W 2050/0026* (2013.01); *B60W 2540/10* (2013.01); *B60W 2710/083* (2013.01); *B60W 2710/1005* (2013.01); *B60W 2720/403* (2013.01); *Y02T 10/645* (2013.01); *Y02T 10/648* (2013.01); *Y02T 10/7283* (2013.01)

(56) References Cited

U.S. PATENT DOCUMENTS

| | | | | |
|---|---|---|---|---|
| 6,282,492 B1 * | 8/2001 | Gorai | G01C 21/32 | 701/25 |
| 6,537,169 B1 * | 3/2003 | Morii | F16H 3/721 | 475/10 |
| 6,537,189 B1 * | 3/2003 | Gehle | B31F 1/10 | 493/396 |
| 6,896,090 B2 * | 5/2005 | Kanda | B62D 5/008 | 180/402 |
| 7,108,630 B2 * | 9/2006 | Ozeki | B60K 6/48 | 477/3 |
| 7,223,200 B2 * | 5/2007 | Kojima | B60W 20/30 | 477/3 |
| 7,252,619 B2 * | 8/2007 | Tabata | B60K 6/365 | 477/3 |
| 7,291,080 B2 * | 11/2007 | Minagawa | B60K 6/365 | 475/5 |
| 7,822,524 B2 * | 10/2010 | Tabata | B60K 6/445 | 701/53 |
| 8,083,015 B2 * | 12/2011 | Kobayashi | B60K 6/46 | 180/65.21 |
| 8,126,622 B2 * | 2/2012 | Imamura | B60K 6/445 | 701/51 |
| 8,538,648 B2 * | 9/2013 | Schindler | F16D 48/06 | 701/51 |
| 8,649,924 B2 * | 2/2014 | Imaseki | B60K 6/365 | 701/22 |
| 8,965,615 B2 * | 2/2015 | Brandenstein | B60L 11/08 | 701/22 |
| 8,965,650 B1 * | 2/2015 | Otanez | B60W 20/30 | 701/22 |
| 9,187,084 B2 * | 11/2015 | Shibata | B60K 6/445 | |
| 9,216,639 B2 * | 12/2015 | Yamamoto | F02D 41/065 | |
| 9,242,560 B2 * | 1/2016 | Hashimoto | B60L 1/003 | |
| 9,463,697 B1 * | 10/2016 | Gauthier | B60L 3/106 | |
| 9,463,789 B2 * | 10/2016 | Okuda | B60K 6/445 | |
| 9,469,199 B1 * | 10/2016 | Gauthier | B60W 30/18172 | |
| 9,586,486 B2 * | 3/2017 | Kunz | B60L 7/26 | |
| 9,776,527 B2 * | 10/2017 | Sponheimer | B60L 15/2036 | |
| 2003/0078134 A1 * | 4/2003 | Kojima | B60K 6/40 | 477/3 |
| 2003/0181276 A1 * | 9/2003 | Minagawa | B60K 6/365 | 475/5 |
| 2007/0042861 A1 * | 2/2007 | Takaoka | B60K 6/365 | 477/3 |
| 2008/0312022 A1 * | 12/2008 | Martin | F16H 3/66 | 475/83 |
| 2009/0069966 A1 * | 3/2009 | Tabata | B60W 20/30 | 701/22 |
| 2009/0075774 A1 * | 3/2009 | Tabata | B60K 6/445 | 475/150 |
| 2013/0173100 A1 | 7/2013 | Takagi | | |
| 2014/0333123 A1 * | 11/2014 | Kunz | B60L 7/26 | 303/3 |

FOREIGN PATENT DOCUMENTS

| | | |
|---|---|---|
| DE | 112012006106 T5 | 1/2015 |
| EP | 0622264 A2 | 11/1994 |
| EP | 2444273 A2 | 4/2012 |
| JP | H07-15804 A | 1/1995 |

\* cited by examiner

|  | Front-axle clutch is disengaged | Front-axle clutch is engaged, 1st gear | Front-axle clutch is engaged, 2nd gear | |
|---|---|---|---|---|
| Rear-axle clutch is disengaged | Not available | 1 | 2 | |
| Rear-axle clutch is engaged, 1st gear | 3 | 4 | 5 | |
| Rear-axle clutch is engaged, 2nd gear | 6 | 7 | 8 | |
| ... | | | | ... |

Fig. 11

OPERATING STRATEGY FOR AN ELECTRICALLY DRIVEN ALL-WHEEL-DRIVE VEHICLE

CROSS-REFERENCE TO RELATED APPLICATIONS

The present application claims priority under 35 U.S.C. § 119 to European Patent Publication Nos. EP 15181983.6 (filed on Aug. 21, 2015) and EP 16167305.8 (filed on Apr. 27, 2016), which are each hereby incorporated by reference in their respective entireties.

TECHNICAL FIELD

Embodiments relate to a method for operating a vehicle comprising at least one first electric motor and at least one second electric motor as drive motors.

BACKGROUND

Vehicles having drive motors can be designed, in particular, in such a way that a front axle of the vehicle can be driven by a first electric motor and a rear axle of the vehicle can be driven by a second electric motor.

Vehicles comprising an electric drive (battery-electric, fuel cell, serial hybrid) are driven primarily at one axle by way of an electric motor. As is also the case with vehicles operated in a conventional manner, the demand for all wheel-driven drive trains will increase in the future, however, due to the better traction (acceleration, climbing capacity) thereof.

A mechanical all-wheel drive design is less suitable for electrically driven vehicles due to the poor efficiency and the necessary installation space. Since electric drives are connected by power cables, there is no mandatory mechanical connection (jointed shafts) between the front axle and the rear axle. The two axles are therefore independent of one another and can be configured individually.

A vehicle comprising two electric motors as drive motors can therefore be designed in such a way that a front axle of the vehicle can be driven by the first electric motor and a rear axle of the vehicle can be driven by the second electric motor.

SUMMARY

A problem addressed by embodiments is that of providing a method for operating a vehicle of the type mentioned, which ensures an economical operation of the two electric motors, and of providing a vehicle, which is prepared for such a method.

The problem is solved by a method for operating a vehicle, the method comprising: providing at least one first electric motor and at least one second electric motor which are discontinuously different from one another; exclusively driving a front axle of the vehicle by the at least one first electric motor; and exclusively driving a rear axle of the vehicle by the at least one second electric motor; operating the at least one first electric motor and the at least one second electric motor using a torque which is dependent upon a characteristic map defining areas which are delimited depending on a driver-requested torque and a vehicle speed, wherein the characteristic map defining areas have torque distributions for the at least one first electric motor and the at least one second electric motor.

As a result, an operation of the vehicle having an improved overall system efficiency can be achieved by implementing a selected area of the characteristic map depending on the present vehicle speed and the present driver-requested torque.

In accordance with embodiments, a characteristic map is used for operating a vehicle, which describes multiple delimited areas of different system configurations and/or torques on axes having the input parameters "driver-requested torque" and "vehicle speed." The different areas differ from one another in that, in the areas, different electric motors are activated or are entirely or almost deactivated, or, more generally, the torque distribution in different areas is discontinuously different from one another, for example, a torque distribution of 50:50 to the two motors in one area and, in an adjoining area of the characteristic map, a torque distribution of 70:30.

In accordance with embodiments, the "torque distribution" defined in the characteristic map can therefore also include a different torque, which is achieved by deactivating a motor, for example, by disconnecting the motor from the drive train via clutches, so that the motor can contribute a torque of zero to the propulsion of the vehicle.

In accordance with embodiments, the driver-requested torque can be specified by the driver, in particular, by actuation of a pedal, for example, a gas pedal or an accelerator pedal.

In accordance with embodiments, a vehicle operated according to the invention, due to the use of discontinuous transitions between different system states or operating modes of the electric motors, offers the possibility of a torque distribution which has been optimized in terms of efficiency, depending on the driver request and on the vehicle speed.

In accordance with embodiments, the system states and the torque distribution can always be selected in such a way that the vehicle has the best overall efficiency. The solution according to the invention can utilize off-line optimizations in this case, since the characteristic map can be established in advance for a vehicle or a vehicle type. Furthermore, anticipatory systems and/or a state monitoring of the components of the vehicle can be taken into account in the method.

In accordance with embodiments, the characteristic map defines at least two areas, wherein, in one of the two areas, either exclusively or at least substantially predominantly, only one electric motor is activated and, in the other of the two areas, both electric motors are activated. "Substantially predominantly" means, in this case, that the other electric motor is operated using only a residual torque, for example, approximately 5% or approximately 10% of a maximum torque, in order to prevent the electric motor from shutting off.

In accordance with embodiments, depending on the driver-requested torque and the vehicle speed, i.e., on the characteristic map, that area is implemented in which, either exclusively or at least substantially predominantly, only one electric motor is activated, or that area is implemented in which the first and the second electric motors are activated.

In accordance with embodiments, the characteristic map defines at least three areas, wherein, in a first area, the first electric motor is activated, in particular exclusively or predominantly the first electric motor is activated and, in a second area, the second electric motor is activated, in particular exclusively or predominantly the second electric motor is activated and, in a third area, both electric motors are activated, in particular the two electric motors delivering approximately the same torque. In the first area, the front axle can therefore be driven exclusively, in the second area, the rear axle can be driven exclusively, and in the third area, both axles can be driven. At least two of the three areas can directly adjoin one another in the characteristic map, preferably all at least three areas directly adjoin each of the two other areas in the characteristic map. The number of defined areas can depend on the efficiency properties of the vehicle components. A total of at least three areas must be defined, however. The activation torque of the two motors can also be different when both motors are activated, when, for example, different gears are engaged for each axle in the upstream multi-stage transmissions for each axle, or the gear ratios of the downstream multi-stage transmissions for each motor are different, or the single gear ratio of the first motor and of the second motor on the particular drive axle differs.

In accordance with embodiments, below a predefined low driver-requested torque, at a slow vehicle speed, the first area is implemented, in which the first electric motor is activated and, at a moderate vehicle speed, the second area is implemented, in which the second electric motor is activated and, at a high vehicle speed, the third area is implemented, in which the first and the second electric motors are activated. At a slow vehicle speed, therefore, the front axle can be driven exclusively, at a moderate vehicle speed, the rear axle can be driven exclusively, and at a high vehicle speed, both axles can be driven.

In accordance with embodiments, above a predefined high driver-requested torque, preferably at any vehicle speed, the third area is implemented, in which the first and the second electric motors are activated.

In accordance with embodiments, at least one transition between area boundaries of the characteristic map is implemented by way of an electric motor being switched on or off and/or by way of an electric motor being coupled to or decoupled from the drive train and/or by way of an electric motor being set to a predefined, fixed, minimum torque and/or by way of an electric motor being set to a new operating torque and/or by way of a change in the gear of a shiftable transmission taking place. In particular, when a boundary between two areas of the characteristic map is exited, an electric motor can therefore be deactivated entirely or to a large extent, for example, up to a small residual torque or minimum torque, e.g., of approximately 5% or approximately 10% of a maximum torque. In this case, a non-driven axle can also be decoupled or disconnected from the drive train. The discontinuously different torque distributions can also be implemented by different gears of a transmission.

In accordance with embodiments, the area of the operation of the first and/or second electric motor is changed, depending on the characteristic map, only when an additional plausibility check has a positive result. The characteristic map therefore becomes multi-dimensional. Discrete transitions at the area boundaries (e.g., disengage/engage a clutch, activate/deactivate a motor) are usually associated with driveability losses, especially when this would result in a state change which is too frequent. This problem can therefore be reduced when the switches between areas for optimizing the efficiency are carried out only in a "braked" manner, so that, for example, when a boundary is exited only briefly, this does not necessarily have to induce a change in the system state.

In accordance with embodiments, the additional plausibility check can represent a hysteresis of the driver-requested torque of the characteristic map, wherein the hysteresis can be effective both when an area boundary is exited or entered. The additional plausibility check can include a temporal prediction. The temporal prediction can take place, for example, by the use of external information such as GPS information regarding the intended route and/or by an analysis of the vehicle surroundings, for example by recognizing traffic signs, ADAS sensors, and/or by analyzing vehicle data such as slope sensors, steering angle sensors, etc. The additional plausibility check can include an efficiency comparison between an efficiency which would result if the area of the characteristic map were changed and an efficiency which would result if the area of the characteristic map were not changed.

In accordance with embodiments, the additional plausibility check accounts for a derating of the first and/or the second electric motor. "Derating" refers to the danger of an overheating of an electric or electronic component depending on its maximum permissible power loss and depending on its ambient and component temperature. A method according to the invention therefore preferably accounts for the derating influence of HV (high-voltage) components. The torque distribution is changed, for example, when a motor is on the verge of entering the derating.

Embodiments relate to a vehicle comprising at least one first electric motor and at least one second electric motor; a front axle to be exclusively driven by the at least one first electric motor; and a rear axle to be exclusively driven by the at least one second electric motor; and a control unit, configured to operate the at least one first electric motor and the at least one second electric motor using a torque which is dependent upon a characteristic map defining areas which are delimited depending on a driver-requested torque and a vehicle speed, wherein the characteristic map defining areas have torque distributions for the at least one first electric motor and the at least one second electric motor.

DRAWINGS

Embodiments will be illustrated by way of example in the drawings and explained in the description below.

FIG. 1 schematically illustrates fundamental possibilities of an electric drive for a vehicle, in accordance with embodiments.

FIG. 2 illustrates a customary distribution of efficiency and operating points of an electric motor, in accordance with embodiments.

FIGS. 3(a) to 3(d) illustrate different configurations of an electric, all-wheel drive vehicle, in accordance with embodiments.

FIGS. 4(a) to 4(c) illustrate different architectures for an electric motor, in accordance with embodiments.

Figure 8:
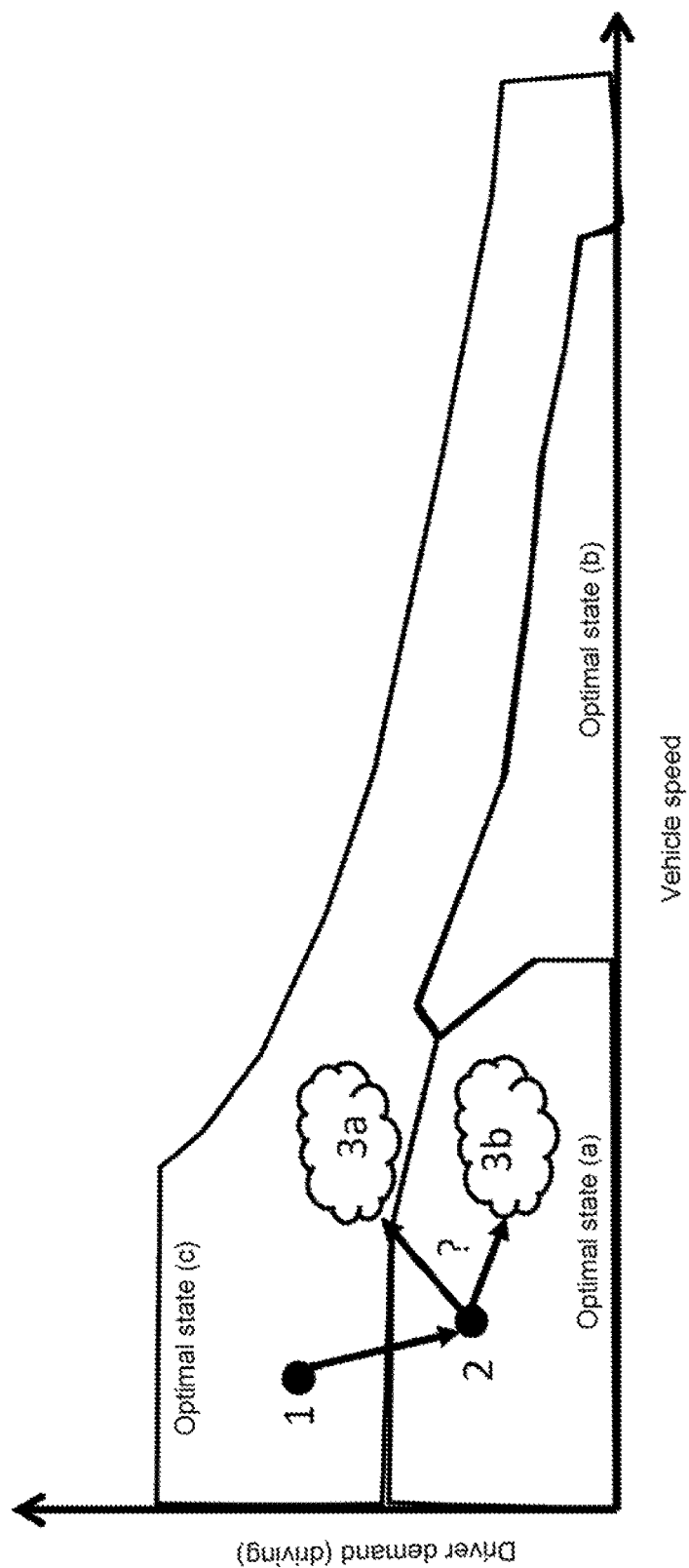

FIG. 8 schematically illustrates a selection of possible states or areas in a method, in accordance with embodiments.

Figure 9:
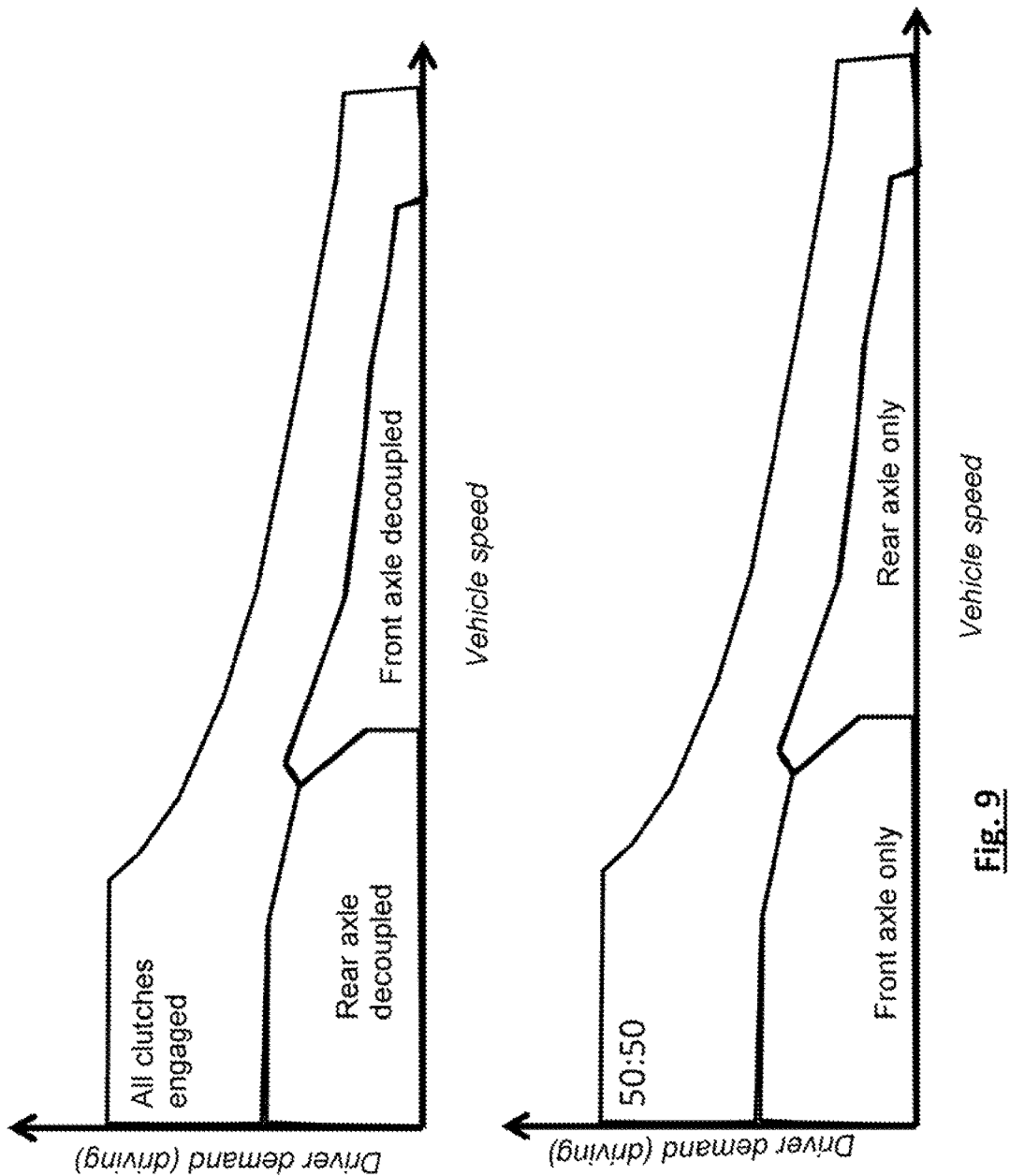

FIG. 9 illustrates, at the top, a characteristic curve 1 having system states and, at the bottom, a characteristic curve 2 having torque distributions, each of which is in a globally optimal state, in accordance with embodiments.

Figure 10:
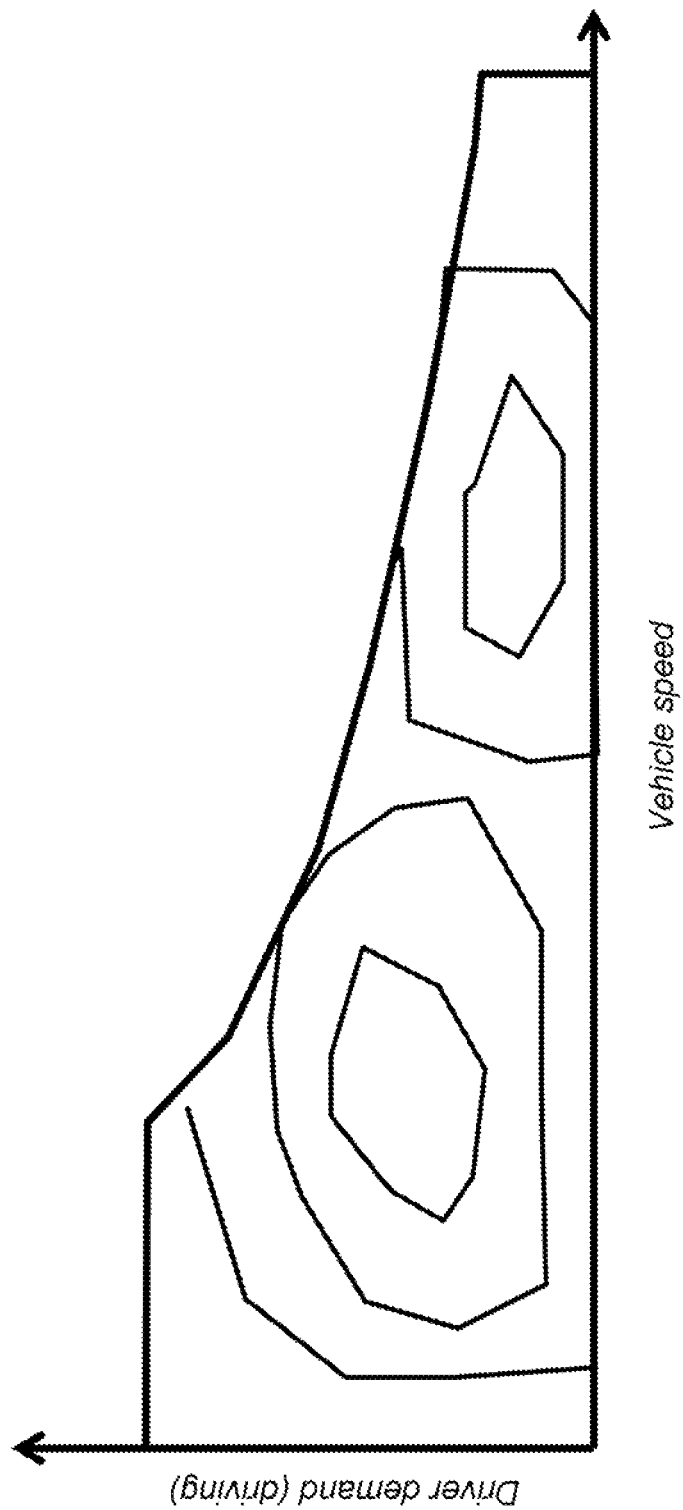

FIG. 10 illustrates a characteristic curve 3 having overall system efficiencies in a globally optimal state, in accordance with embodiments.

FIG. 11 illustrates different possible system states for vehicles having different clutches and transmissions, in accordance with embodiments.

Figure 12:
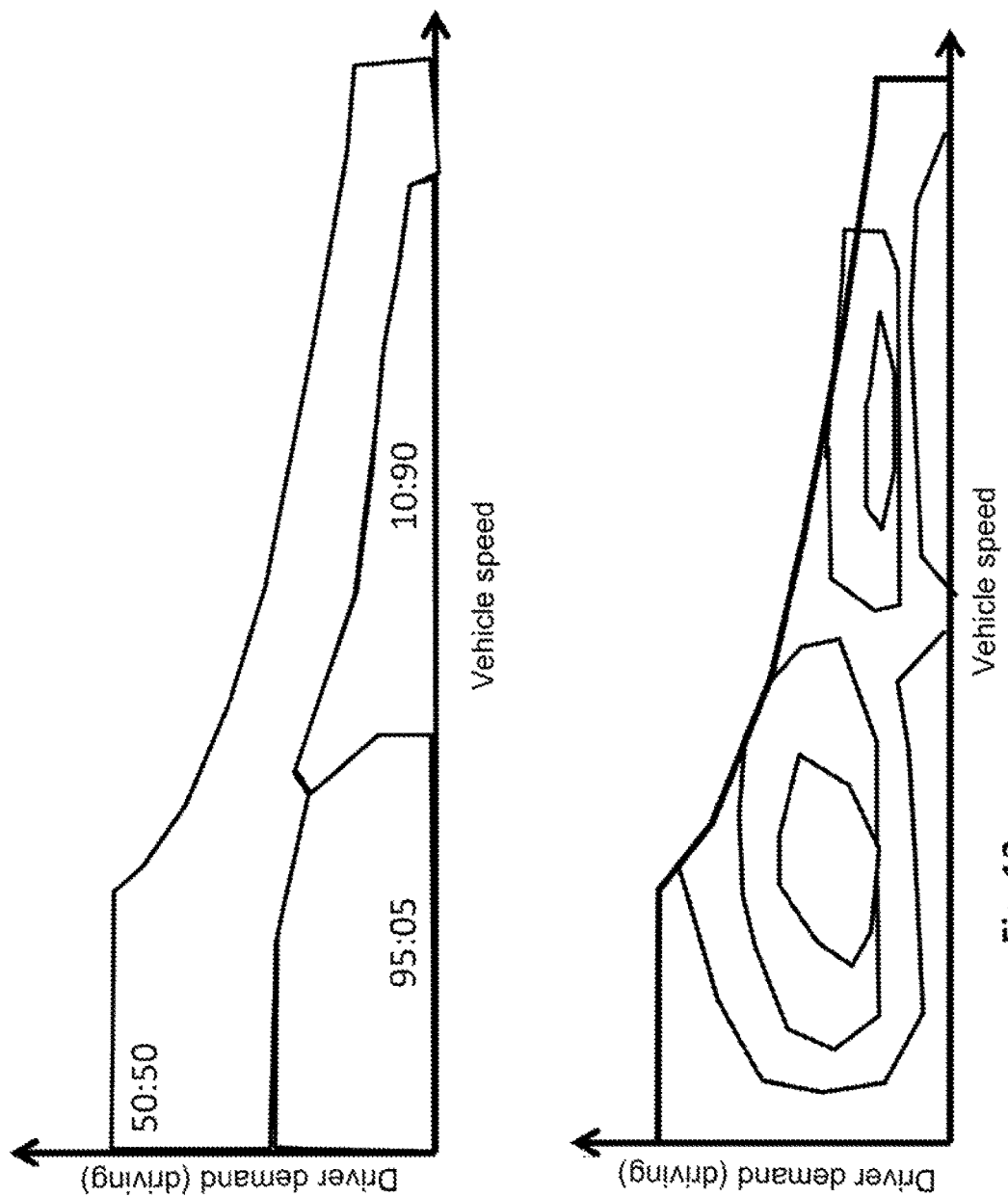

FIG. 12 illustrates, at the top, a characteristic curve 2 having torque distributions and, at the bottom, a characteristic curve 3 having efficiencies, each of which is in a presently optimal state, in which, for example, all clutches are engaged, in accordance with embodiments.

Figure 13:
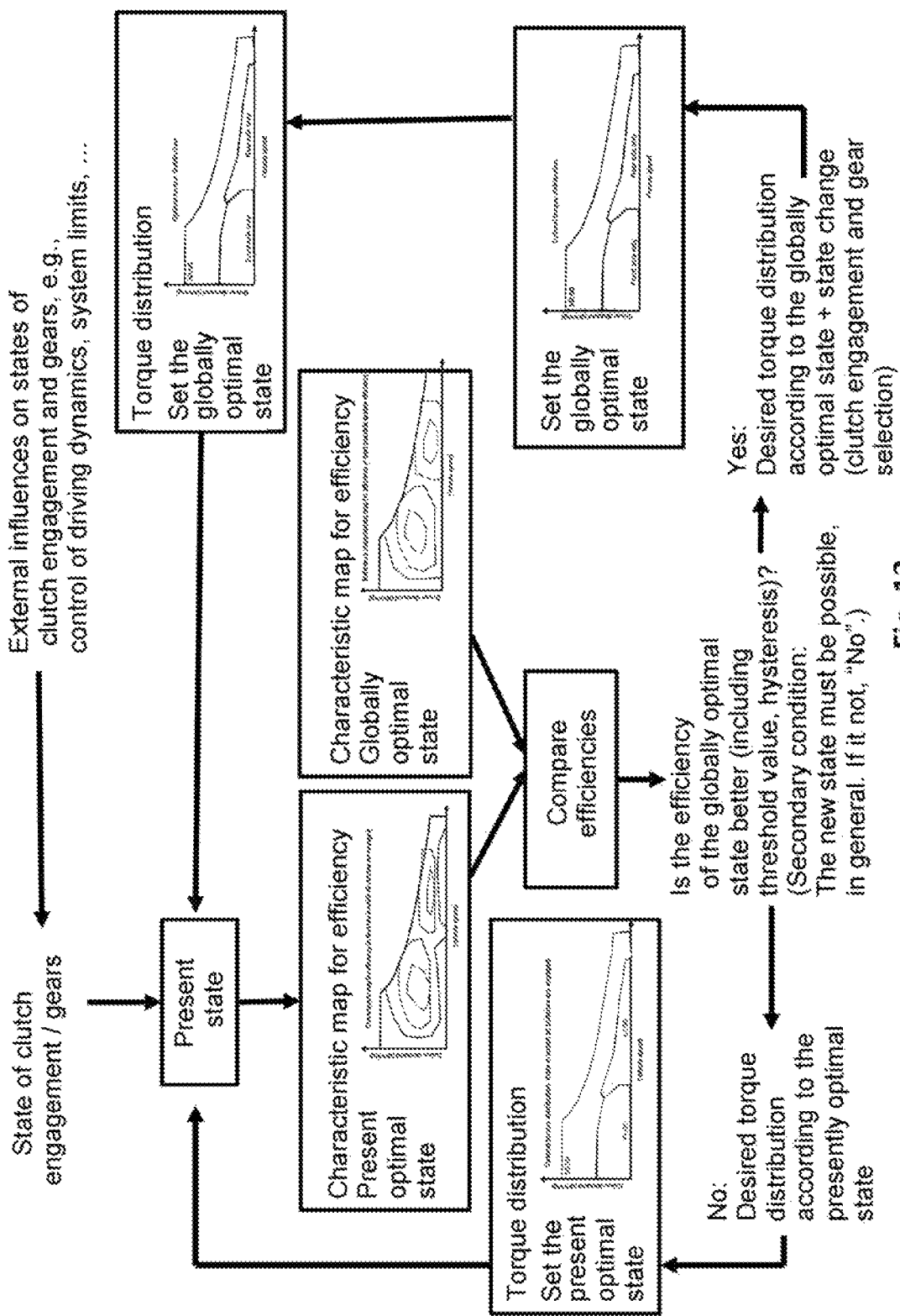

FIG. 13 illustrates a flow chart for selecting the optimal torque distribution and, if necessary, the state change of clutches/gears, in accordance with embodiments.

Figure 14:
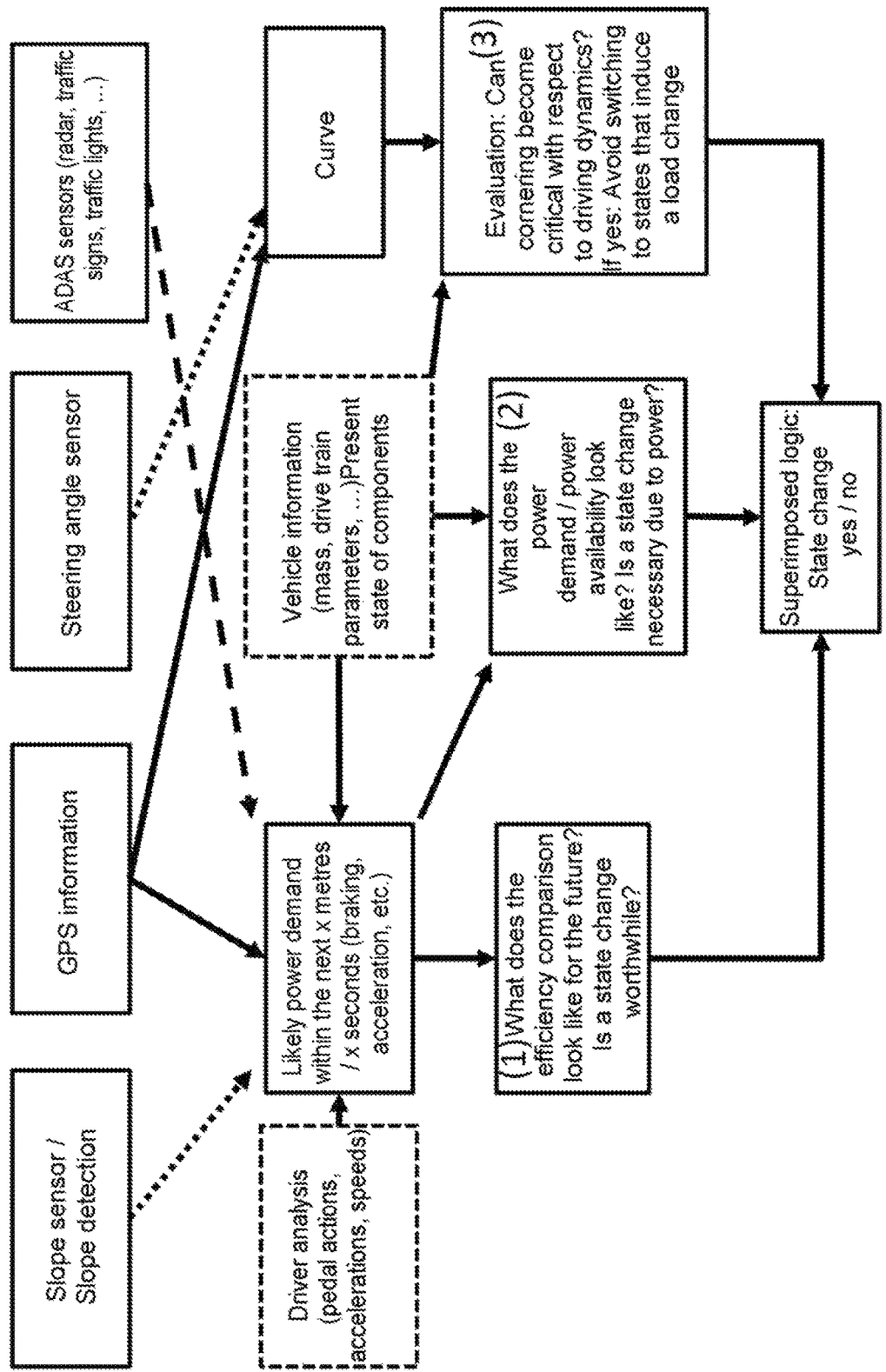

FIG. 14 illustrates a flow chart for the possible coupling to an anticipatory operating strategy for the control of the clutches and the torque distribution, in accordance with embodiments.

Figure 15:
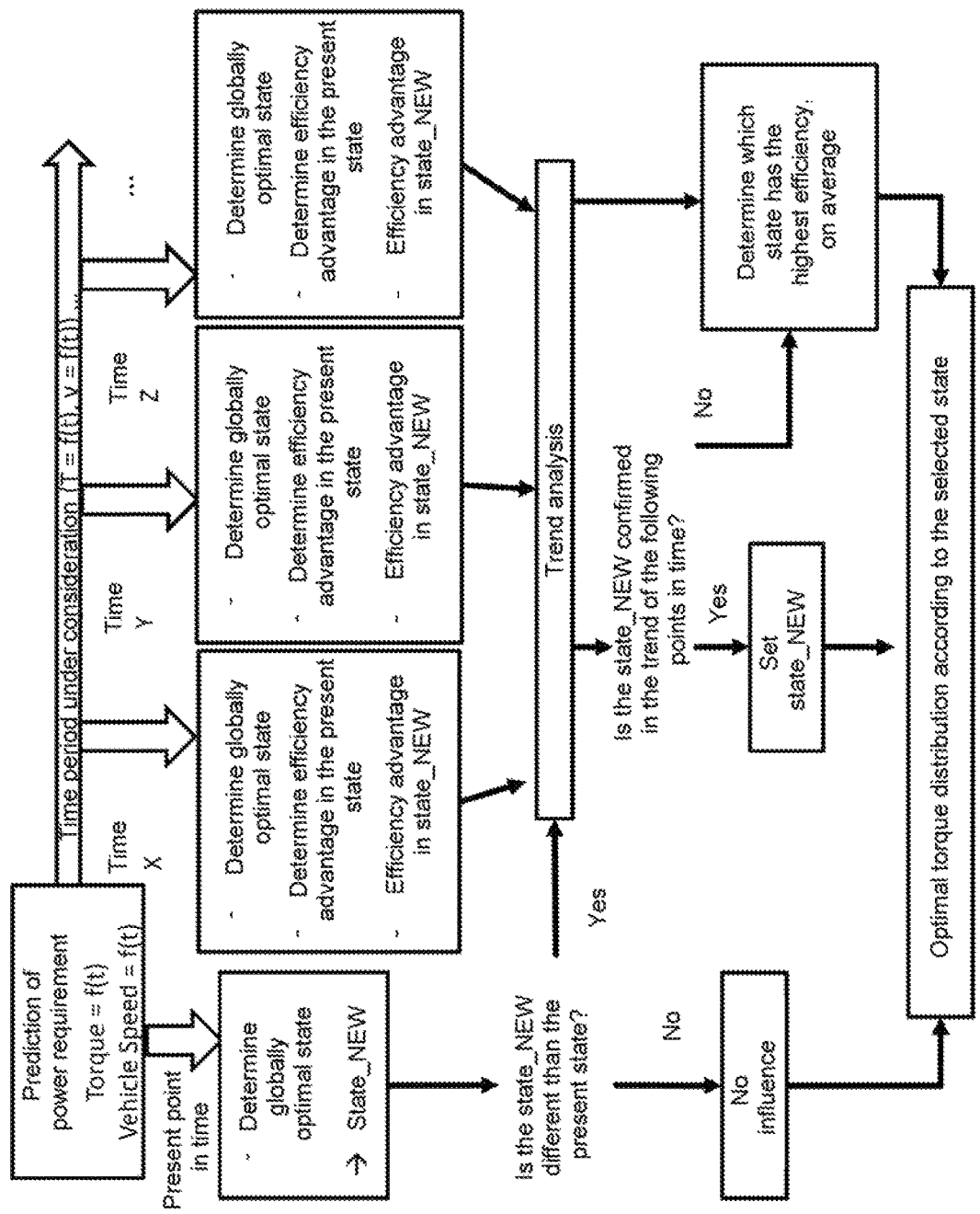

FIG. 15 illustrates a detailed depiction of the efficiency optimization according to block (1) of FIG. 14.

Figure 16:
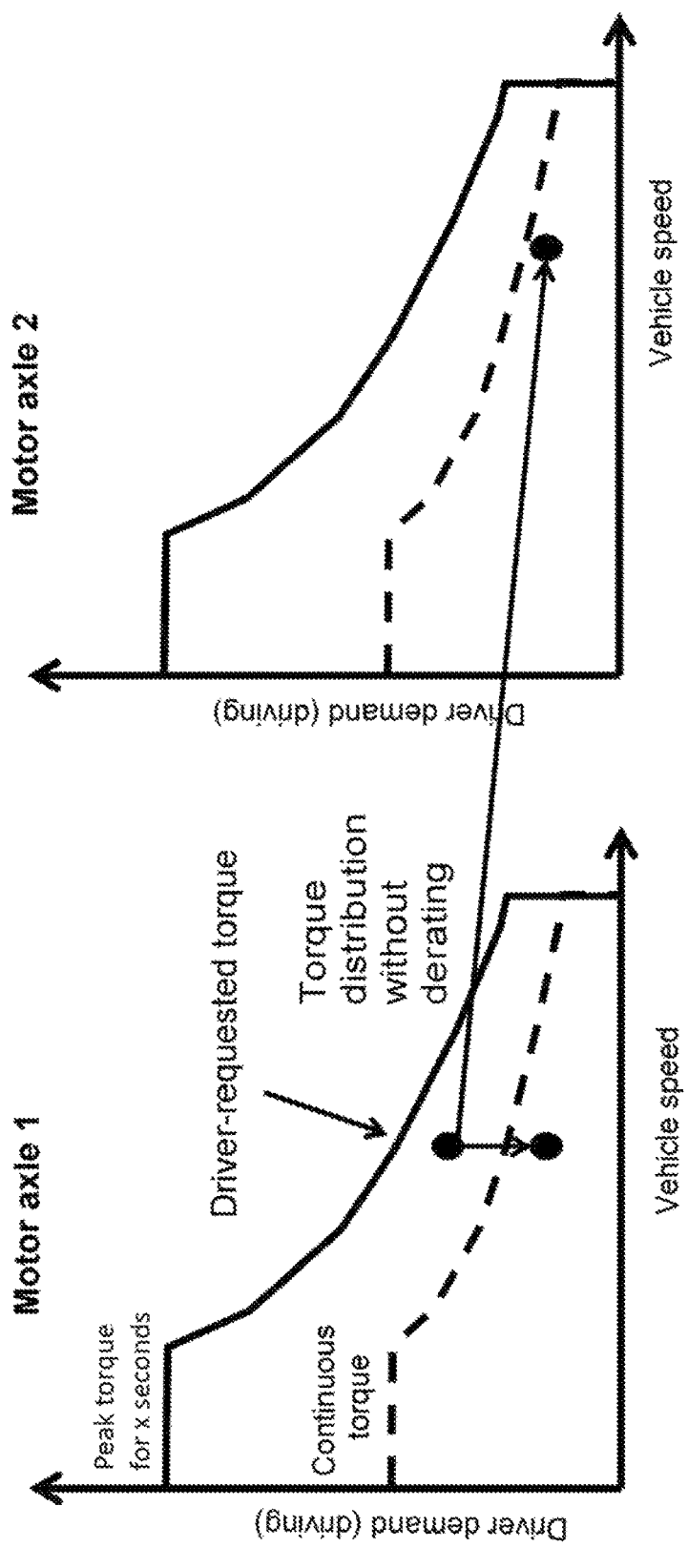

FIG. 16 illustrates a detailed depiction of the power and derating optimization according to block (2) of FIG. 14.

Figure 17:
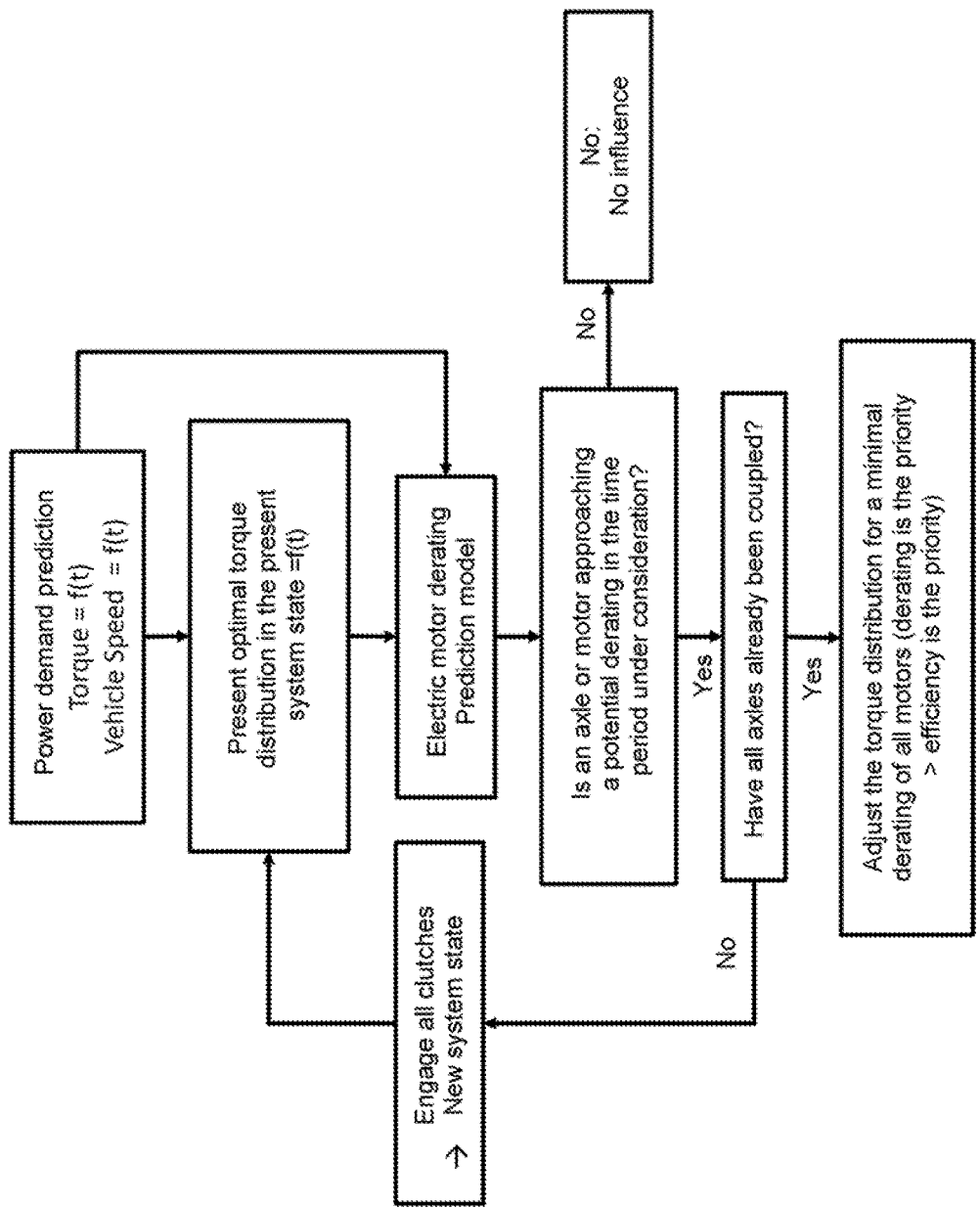

FIG. 17 illustrates a flow chart for accounting for derating in a method, in accordance with embodiments.

Figure 18:
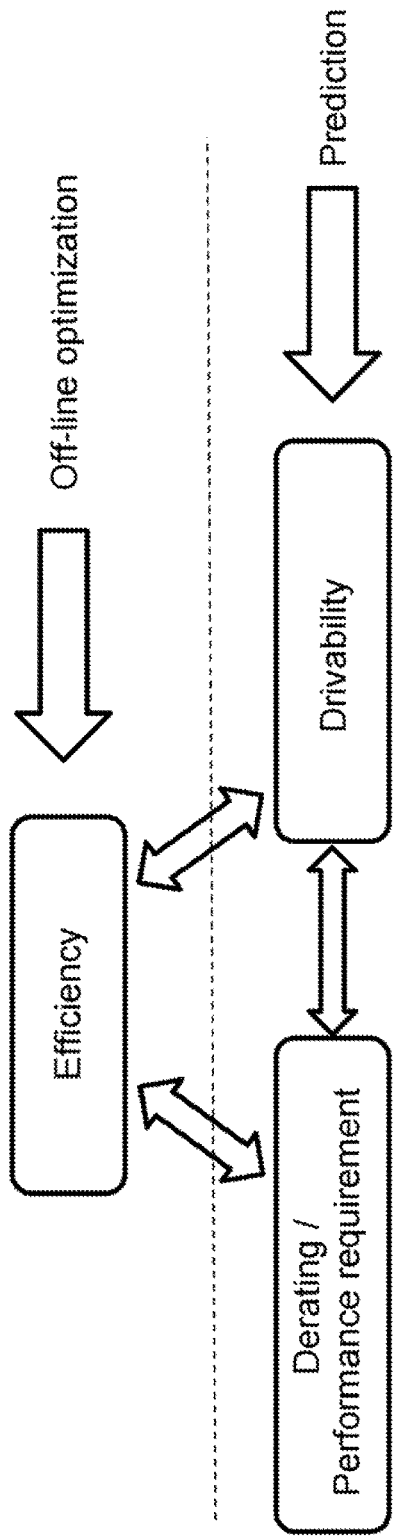

FIG. 18 schematically illustrates possible modules for implementing a method, in accordance with embodiments.

DESCRIPTION

Figure 1:
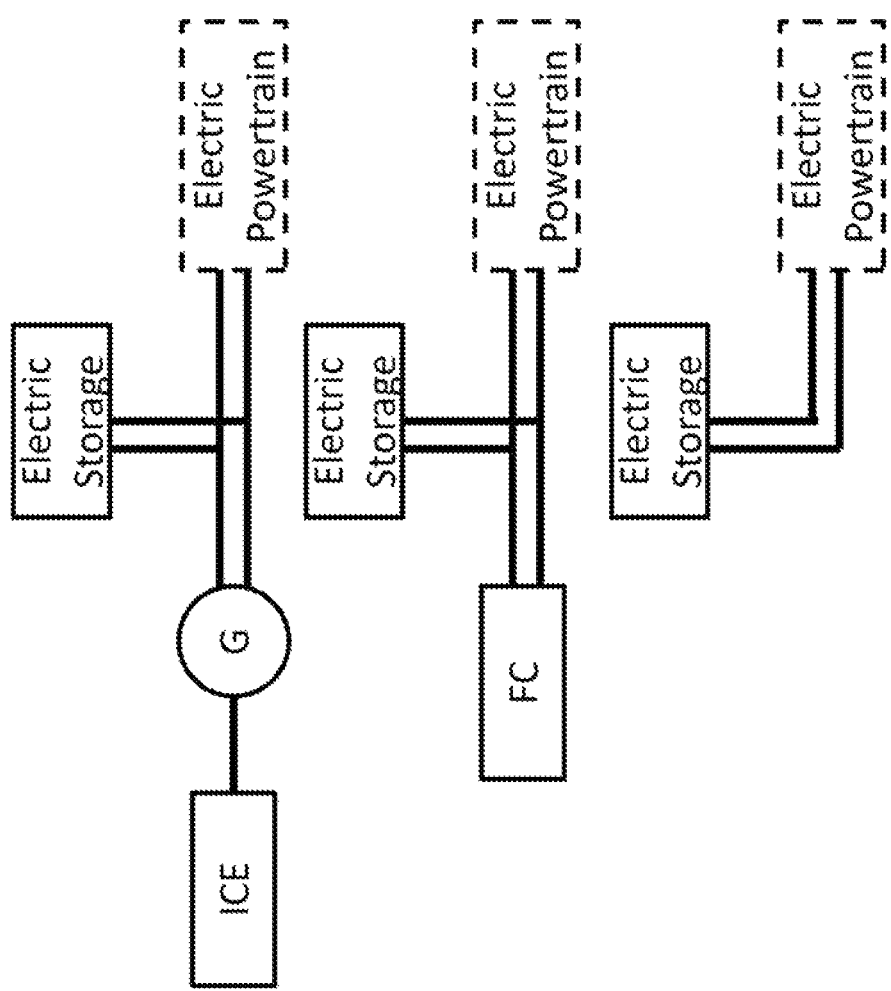

FIG. 1 illustrates fundamental possibilities of an electric drive for a vehicle. An electrically driven vehicle is driven via one or multiple electric motors and, optionally, via single-stage or multi-stage transmissions. In this case, the energy can be provided only by a battery (electric storage), as a battery-electric vehicle (depiction at the bottom in FIG. 1), by a fuel cell (FC), as a fuel cell vehicle (depiction in the middle in FIG. 1), or by an internal combustion engine (ICE) and a generator (G), in the form of a serial hybrid (depiction at the top in FIG. 1), and combinations of these possibilities.

Depending on the design and the type, electric motors usually have their efficiency optimum and their nominal efficiency in the middle to high speed area and at partial load to full load. Due to the relatively low load demand in the statutory driving cycles, the operating points are usually not in this efficiency optimum. See FIG. 2 in this regard.

Figure 2:
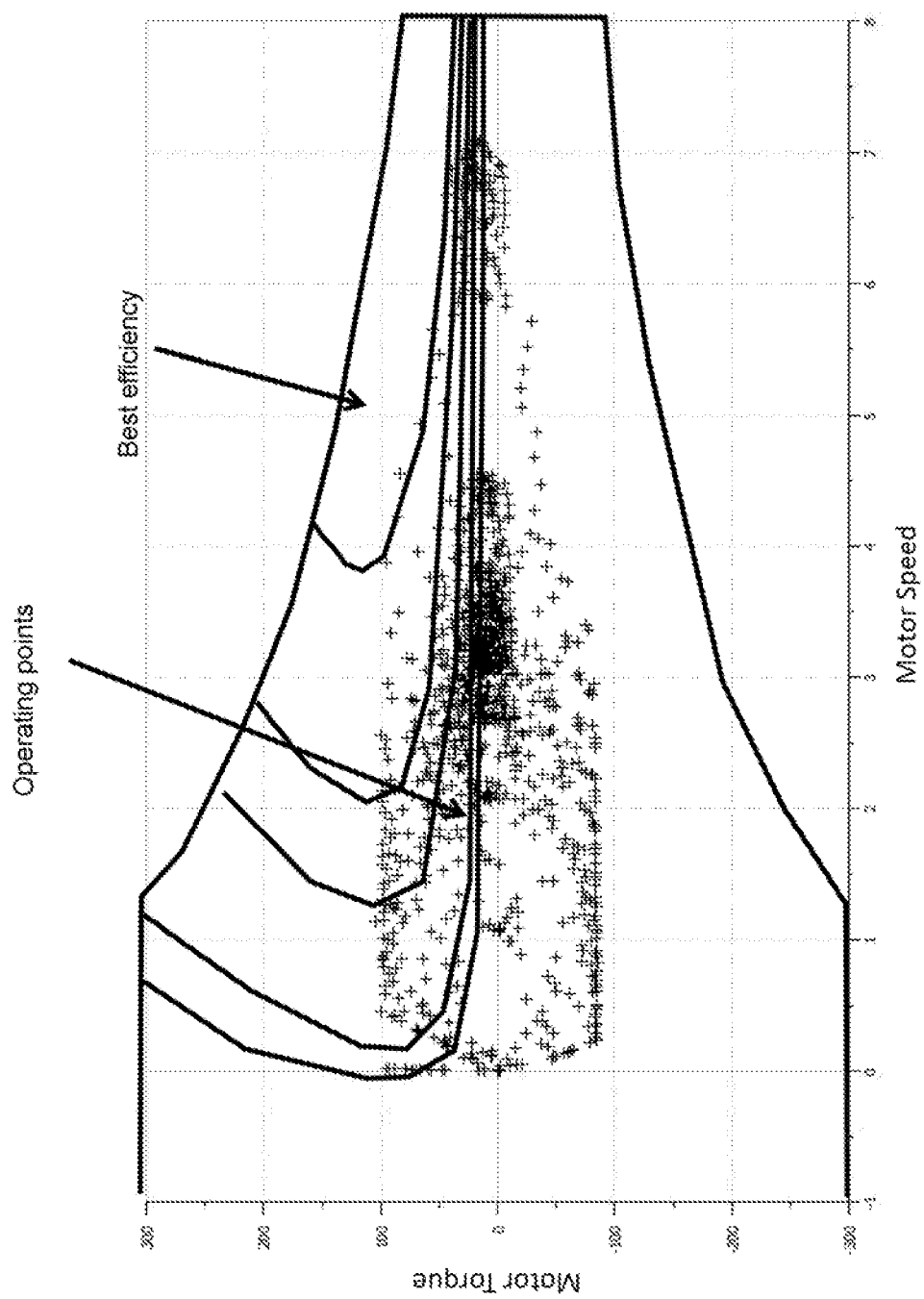

As illustrated in FIG. 2, these operating points in the driving cycles are usually at low partial load (torque, motor torque) and, specifically in city driving, at low speeds (motor speed). Since the electric motors are fixedly connected to the wheel via a transmission ratio and, therefore, the speed is proportional to the wheel speed and the tractive force demand by the driver is proportional to the torque, there is no possibility for improving these operating points if a shiftable transmission is not present.

It is advantageous in this case to use an electric all-wheel drive, i.e., electric drives at the front axle and the rear axle, and to distribute the maximum torque/maximum power to multiple motors. The individual motors can therefore be made smaller.

Figure 3:
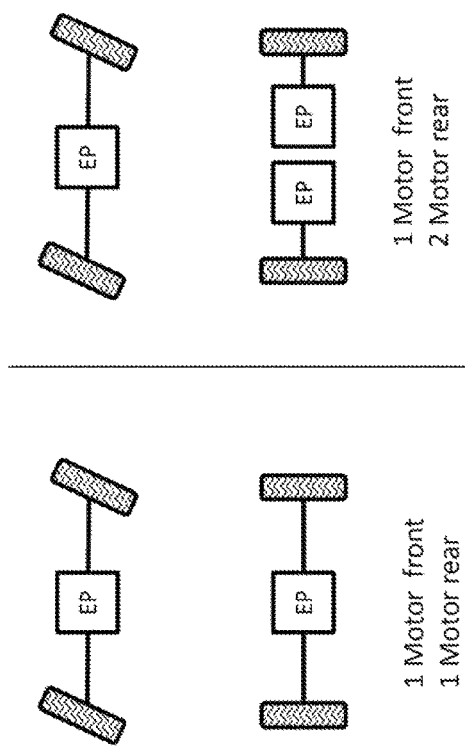

An electric all-wheel drive can be defined by the four configurations of 2 to 4 electric drives illustrated in FIG. 3. The front axle and the rear axle are illustrated for each configuration. In this case, EP (electric propulsion unit) comprises an electric motor. The possibilities therefore extend from one motor per axle, coupled via a differential to the two wheels, up to one individual electric motor per wheel (close to the wheel or the wheel hub). In this case, different architectures of each drive unit (EP) for each axle are also possible. These influence the operating strategy and the efficiency of the vehicle.

Figure 4:
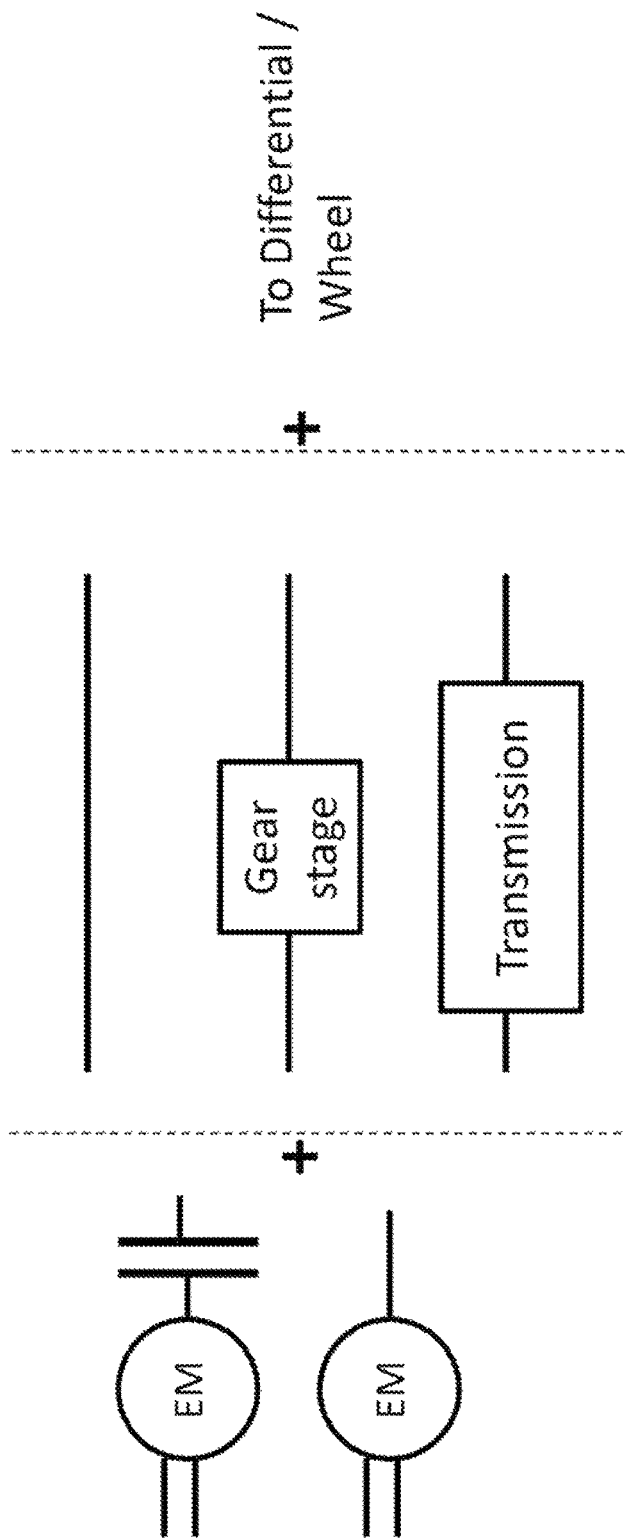

Different structural architectures of an electric motor (EM) are illustrated in FIGS. 4(a) to 4(c).

As illustrated in FIG. 4(a), with respect to a clutch, there are at least the possibilities that no clutch is present (the electric drive cannot be disconnected from the wheel, and the drag torque of the drive increases the road resistance during non-utilization of the EM). There are also at least the possibilities that a clutch is present, in which the electric drive can be disconnected from the wheel, and there is no drag torque on the axle during non-utilization.

As illustrated in FIG. 4(b), with respect to a transmission, there are at least the possibilities that no transmission is present, in which the motor is directly connected to a wheel. There is also at least the possibilities of a transmission ratio, in which the electric motor is connected to the wheel with a fixed transmission ratio. There is at least the possibilities of a multi-stage transmission, in which the transmission can adjust the load point; in addition, a decoupling function can also be implemented, depending on the design, i.e., there is no drag torque on the wheel during non-utilization of the motor.

As illustrated in FIG. 4(c), the drive can be connected to a differential, or directly to a wheel of the vehicle.

An electric all-wheel drive also means that the torque distribution is freely selectable. It is possible to drive with both axles or with only one axle, in particular depending on the torque demand from the driver. This means that, in the case of low load/partial load, driving can only be carried out with one axle, while the second axle moves idly along. Since the individual motors are made smaller (the overall drive power of all motors remains the same as in the single-axle drive concept), this therefore automatically results in an increase in the load point. Relatively speaking, the smaller axle runs at a higher load and, therefore, with better efficiency. This results in an improvement in the area and efficiency as compared to a vehicle according to the invention having all-wheel drive and multiple motors, and as compared to a vehicle having a single electric motor.

Figure 5:
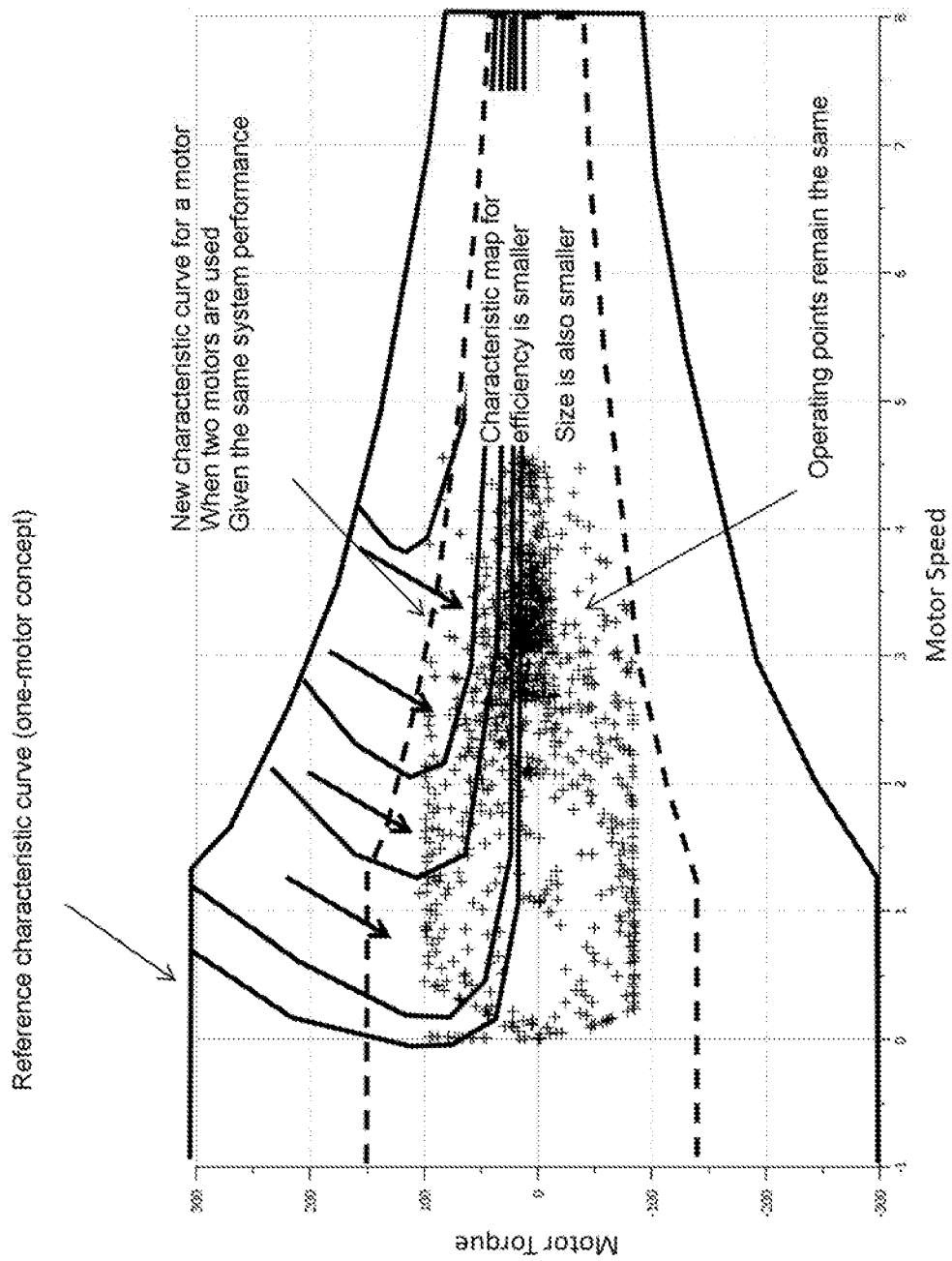
FIG. 5 illustrates a distribution of efficiency and operating points of an electric motor, in accordance with embodiments.

An electric all-wheel drive in accordance with embodiments also means that the two axles are mechanically independent of one another and, therefore, driving can also take place using only one axle. As illustrated in FIG. 5, the operating points shift toward better efficiencies (solid reference characteristic curve toward the new, dashed characteristic curve), which, in normal driving cycles, results in increased efficiency.

In accordance with embodiments, when multiple driven axles are utilized, the electric motor(s) of the axles can have different designs and/or functions. For example, axle 1 is operable for improved efficiency for the lower speed area/partial load area for city driving, whole axle 2 can be operable for improved efficiency for the moderate speed area/partial load area for driving long distances/highway driving. Alternatively, axle 1 may be operable for improved efficiency for operation in the motor mode (driving), while axle 2 may be operable for improved efficiency for operations in the generator mode (brake energy recuperation).

In accordance with embodiments, fundamentals of the method may be utilized primarily for distributing the torque requested by the driver to all electric motors with optimal efficiency (the operating method is also referred to in the following as the "operating strategy"). A secondary condition in this case is: the torque distribution takes place only between the front axle and the rear axle. If multiple motors are intended to be installed at an axle, in particular individually for each wheel, the demanded axle torque is distributed equally to both motors, on the left and on the right. Torque distribution or torque vectoring between two motors at one axle caused by control interventions into driving dynamics will not be described here.

In accordance with embodiments, the operating strategy may be dependent upon the following factors: (i) characteristic maps for efficiency (transmission, motor, inverter); (ii) clutch disengaged/engaged, and therefore drag torque at the front or rear axle; (iii) gear selection in multi-stage transmissions (for each axle); and minimal demanded torque distribution.

Observation regarding the minimal demanded torque distribution: it can be defined in advance, for example, that both axles are always used for driving (e.g., at least 10% torque distribution at each axle), so that the state of one axle being decoupled does not occur.

The different designs and the degree of freedom of the torque distribution therefore directly result in the need for an optimized operating strategy. The operating strategy must find the torque distribution between the motors of the front and rear axles which has the optimal efficiency, preferably depending on the characteristic maps for efficiency, the speed, the power limits of the components, and the driver request.

Figure 6:
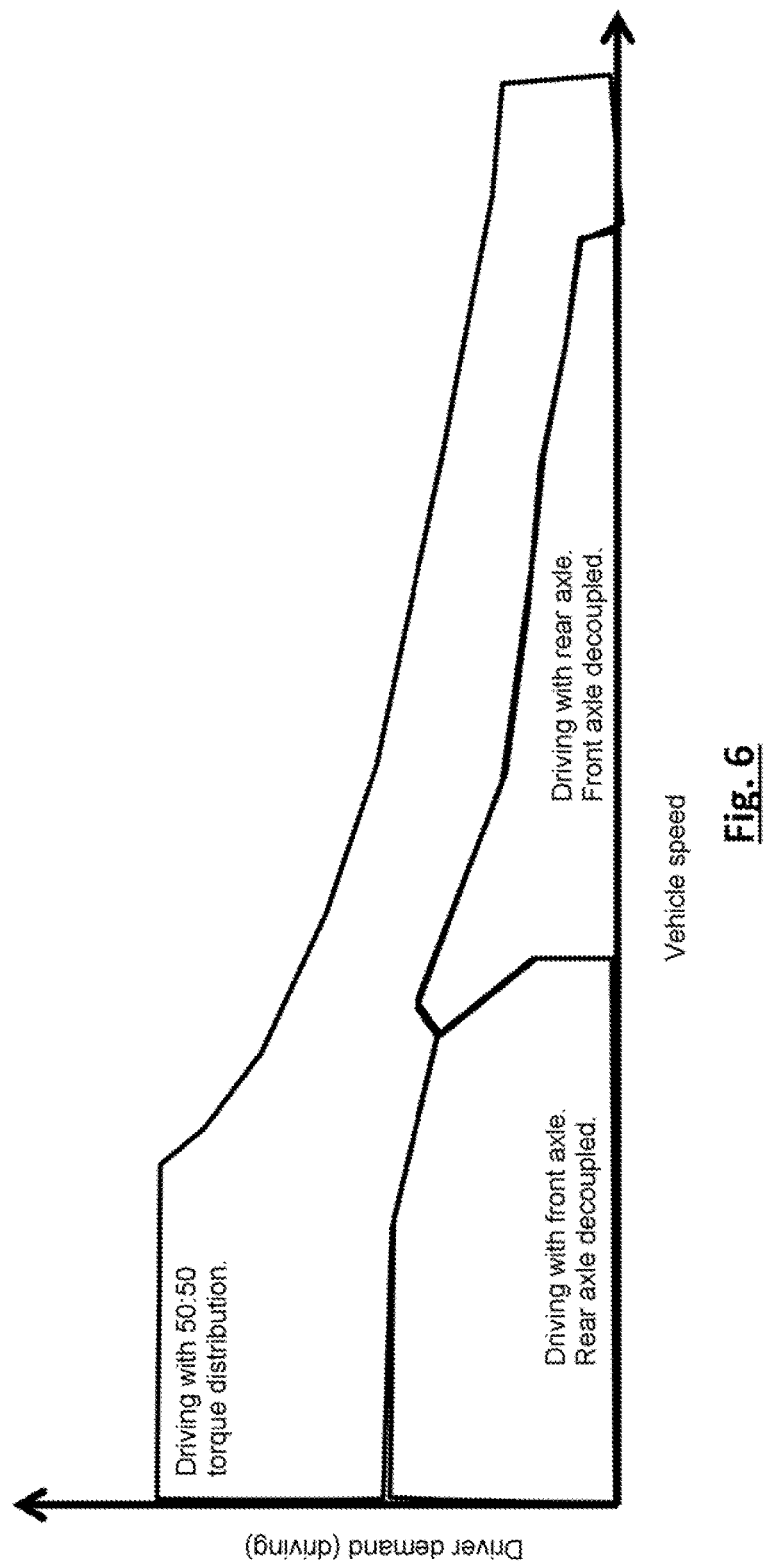
FIG. 6 illustrates, by way of example, a characteristic curve having three delimited areas of a method, in accordance with embodiments.

FIG. 6 illustrates, by way of example, an operating strategy and a method, in accordance with embodiments. This graphic illustrates, in a simplified manner, the optimal torque distribution and the optimal position of clutches (disengaged, engaged) and gears (in the case of multi-stage transmissions) for each operating point (vehicle speed, driver-requested torque). (Observation: the optimal gear selection is not illustrated in this graphic). Three areas are depicted here by way of example. A real characteristic map can also have substantially more areas. In accordance with embodiments, however, at least two areas must be defined.

This characteristic map is determined in advance via an off-line calculation using suitable data for a vehicle type. In this case, however, it is advantageous to not freely jump back and forth between the operating points (constantly engaging and disengaging at the boundary regions). This could result in losses in dynamic strength and driving comfort. In accordance with embodiments, a method can be used for solving this problem.

Figure 7:
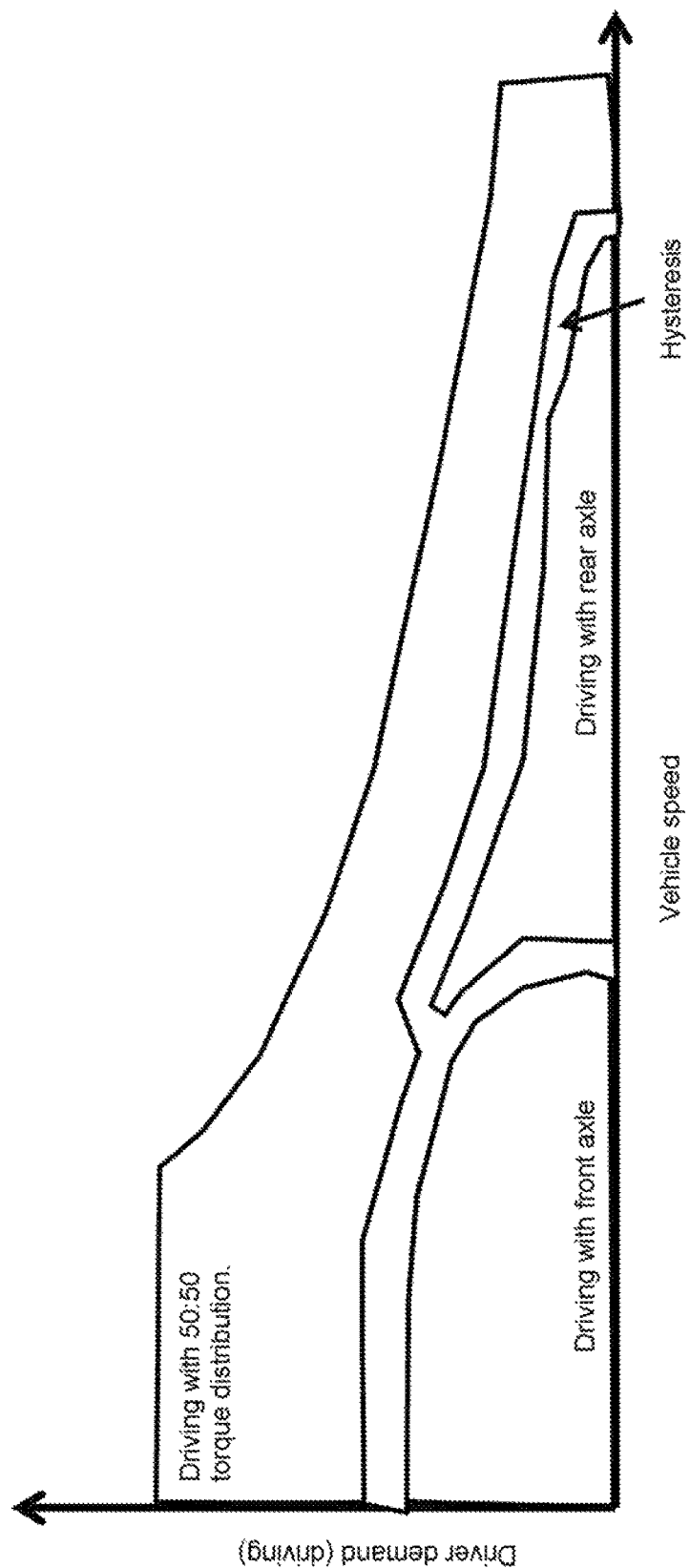
FIG. 7 illustrates, by way of example, a characteristic curve (with hysteresis) having three delimited areas of a method, in accordance with embodiments.

More specifically, there are two sub-problems. The first problem involves switching back and forth between the states in boundary regions between the areas when minor changes occur. A solution therefor can be the introduction of hystereses, as depicted in FIG. 7. The area is not switched when the area boundaries (driver-requested torque and/or vehicle speed) are only slightly exited or entered. Instead, the area is switched only when a hysteresis characteristic curve, which is offset with respect to the area boundary, is passed over outwardly or inwardly. The second problem involves frequent switches between operating points (also in the event of major changes) carried out by the driver.

FIG. 8 illustrates three possible optimal states, by way of example. The vehicle first travels at operating point 1, wherein the optimal state (c) in the system (in the vehicle) is set at this time. In the present time interval, the driver now changes his demand and switches to operating point 2. In theory, the state (a) is more optimal here and would have to be set for an efficient operation of the system. However, the question is whether this makes sense, or whether the driver will change his operating point again in the near future, and so remaining in state (c) would make more sense in order to avoid changing the state in the vehicle too frequently. An estimation as to where the driver will be located in the next X seconds should be carried out on the basis of a prediction. If he will be located in the area (3a) again in the near future, it does not make sense to switch the system state. However, if he will remain in area (3b), a state change from (c) to (a) makes sense and is carried out.

In order to select the correct operating points, the starting situation is the optimal torque distribution and the clutch-engagement and transmission state of the vehicle illustrated in FIG. 8, by way of example. The analysis yields three results: (i) optimal clutch-engagement and transmission-ratio selection=f(speed, axle torque) results in characteristic map 1 (FIG. 9, top); (ii) associated therewith, depending on the clutch-engagement/transmission-ratio selection, the optimal torque distribution=f(speed, axle torque) results in characteristic map 2 (FIG. 9, bottom); and (iii) associated therewith, the highest efficiency of the system or the losses as reference benchmarking=f(speed, axle torque) results in characteristic map 3 (FIG. 10, top).

These characteristic curves are referred to in the following as characteristic curves of a "globally optimal state." One example of a characteristic map 1 (a variation in the clutch-engagement state, transmission-ratio selection is not depicted here) in the globally optimal state is illustrated in FIG. 9, at the top. One example of a characteristic map 2 in the globally optimal state is illustrated in FIG. 9 (bottom). One example of a characteristic map 3 in the globally optimal state is illustrated in FIG. 10.

In addition, the optimal torque distribution and, therefore, corresponding characteristic maps for the optimal torque distribution=f(speed, axle torque, system state Y) and the system efficiency=f(speed, axle torque, system state Y) are determined for every possible clutch-engagement/transmission state Y, as illustrated in FIG. 11. In this case, HA refers to the rear axle and VA refers to the front axle.

In this example illustrated (a 2-stage transmission in each case, with clutch engagement at the front axle and the rear axle), 8 system states (clutch-engagement/gear-selection combinations) would be possible, by way of example. The number can vary, of course, depending on the architecture in the vehicle. The characteristic maps mentioned must be generated for each of these possible system states.

In addition, the optimal torque distribution is determined off-line, as well as the corresponding system efficiency or loss, for each of these combinations.

The characteristic curves of these individual system states are referred to in the following as characteristic curves of the "presently optimal state."

One example of the characteristic maps for one of these states is presented in the following. The two characteristic maps must be created for each state.

The example for characteristic map 2—optimal torque distribution—in a state X, in which both clutches are engaged, is depicted in FIG. 12, at the top.

The example for characteristic map 3—efficiency characteristic map—in the state X, in which both clutches are engaged, is depicted in FIG. 12, at the bottom.

It is important to account for different operating states (clutch-engagement states), for the following reasons: All-wheel drive architectures, in which, in certain operating areas, travel takes place using only one axle, have the disadvantage that the second axle moves idly along, whereby, inter alia, the motor results in a drag torque being present, which, in turn, reduces the efficiency. In this case, it is possible to integrate clutches at the drives in order to entirely disconnect the axles from the drive train in the event of non-utilization and, therefore, to avoid drag losses. This control of the clutches (in order to also, e.g., avoid engaging/disengaging too frequently) is preferably a component of the operating strategy or a component of a method in accordance with embodiments.

Multiple stages for electric motors and, therefore, the gear-selection state is taken into account, for the following reasons: Electric motors are defined by their maximum torque, maximum power, and maximum speed. These areas are adapted to the vehicle demands (maximum vehicle speed, maximum desired tractive force) via gear ratios. In the case of high driving performance demands (high speed, high tractive force or high acceleration torque and starting gradient capability), it is possible that the operating area of the electric motor is unable to meet these demands (conflicting goals: high torque in the lower speed area vs. high speed). A multi-stage transmission, for example, would be useful in this case. A multi-stage transmission can also be useful for partially shifting the operating point of electric motors into areas which possibly have greater efficiency.

Transmissions with and without interruption of tractive force exist for electric motors. Shifting, in particular, is a delicate drivability issue in the case of electric motors, since the driver does not expect to experience shift shocks and an interruption of tractive force. These state changes of transmissions must also be integrated in an intelligent operating strategy, and the shifting frequency must be minimized.

Depending on the present clutch-engagement/transmission state, the corresponding "presently optimal state" is selected, and its optimal efficiency is compared with that of the "globally optimal state."

As illustrated in FIG. 13, the selection of the optimal torque distribution and, if applicable, the state change of clutch engagements/gears takes place.

As illustrated in FIG. 14, in order to further optimize this, it is possible to couple with an anticipatory operating strategy for controlling the clutch engagements and the torque distribution. By utilizing segment data, as well as distance sensors and traffic-sign recognition, future operating areas can be anticipated. It is therefore possible to avoid switching back and forth between clutch engagements, gears, and torque distributions too frequently, which is undesired, thereby increasing the driving comfort. It is therefore possible to avoid a state change in curves, for example, in order to prevent load-change reactions.

In addition, the driving behavior or the driver demand can be statistically pre-estimated in the next x seconds with the aid of anticipatory systems and driver profile recognition. The superimposed question arises here as to whether the new state is also better—and how much better—in the near future as well. If this is not the case, or if the improvement is below a certain threshold value, the old state is retained. Unnecessary shifting or switching between two states is therefore avoided.

In this case, driver profile recognition is considered to be how the driver behaves over a moderate to relatively long period of time (for example, dynamics of gas pedal activity, sporty, calm, etc.).

The behavior or the software utilized in the control unit of the vehicle can also offer the possibility of automatically detecting driver profiles (e.g., an efficient driver, a sporty driver). Since a sporty driver is more concerned about dynamics than efficiency, the operating strategy can be modified, for example, via the driver detection in such a way that the clutches always remain closed, because, in the event of a spontaneous demand for a high torque, there is a time delay until all clutches are engaged and, therefore, also until the engaged, driven axle can also deliver torque.

The priority of the superimposed logic in this case is: (i) high for (3), in order to avoid state changes in situations in which driving dynamics are critical; (ii) moderate for (2), in order to ensure that the performance requirement can be met (avoiding derating); and (iii) low for (1), in order to optimize efficiency A detailed consideration of the optimization of efficiency according to block (1) from FIG. 14 is depicted in FIG. 15. First, a check is carried out to determine whether the state at the present point in time would remain the same, according to the efficiency analysis. If this is not the case, the prediction comes into play. On the basis of a trend analysis, an analysis is carried out to determine whether a state change would be useful. If this trend is confirmed, the new state is set. If the states change too often, according to the predictive trend analysis, the state at which the highest average efficiency is expected is then determined and set.

A detailed consideration of block (2) is depicted in FIG. 16.

Electric motors have a different peak torque and constant torque. The peak torque is available only for a relatively short time and is influenced by the local component temperature. If a motor is operated above the constant power, the peak torque drops after a certain period of time (derating). The use of multiple motors offers the possibility of varying the torque distribution in such a way that: (i) both motors are operated within the constant power in order to obtain the peak system performance; (ii) if one motor is in the derating state, the torque can be distributed to another motor in order to accelerate the recovery of the affected motor.

The torque distribution can also conflict with the overall efficiency, of course, with consideration for the derating. In this way, it can be more efficient to operate a motor above the constant torque (which results in loss of performance over a relatively long time) than to distribute the torque to multiple motors. In this case as well, an anticipatory operating strategy and driver recognition offers advantages for solving the conflict of performance requirement vs. efficiency. This problem is also preferably superimposed on the decision regarding the system states and the torque distribution, as illustrated in greater detail in FIG. 17.

In accordance with embodiments, a method for operating an electrically driven, all-wheel drive vehicle can therefore comprise the following control blocks: (i) utilizing an efficiency-based operating strategy for torque distribution and for clutch-engagement control/gear selection; (ii) utilizing an anticipatory operating strategy and driver profile recognition for torque distribution and clutch-engagement control/gear selection in order to avoid frequent switches between operating states; (iii) accounting for the derating behavior of the electric drives in the operating strategy mentioned; and (iv) accounting for the derating behavior in combination with an anticipatory strategy and driver profile recognition.

An off-line optimization of the operating behavior therefore relates, as illustrated in FIG. 18, mainly to the efficiency of the vehicle (efficiency), and anticipatory considerations relate to an improvement of drivability and performance requirement of the vehicle and a reduction of derating.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

What is claimed is:

1. A method for operating a vehicle having a plurality of electric motors including at least one first electric motor and at least one second electric motor that are operated discontinuously and differently from one another, the method comprising:
    driving a front axle of the vehicle by the at least one first electric motor;
    driving a rear axle of the vehicle by the at least one second electric motor;
    determining a torque distribution from a characteristic map that defines at least three areas which include:
        a first area in which only the at least one first electric motor is activated in a manner such that the front axle is driven exclusively;
        a second area in which only the at least one second electric motor is activated in a manner such that the rear axle is driven exclusively; and
        a third area in which both the at least one first electric motor and the at least one second electric motor are activated in a manner such that the front axle and the rear axle are driven;
    operating the at least one first electric motor and the at least one second electric motor using the determined torque distribution; and
    disconnecting or decoupling a non-driven axle of the front axle and the rear axle from a drive train of the vehicle.

2. The method of claim 1, wherein the operating includes, depending on the driver-requested torque and the vehicle speed on the characteristic map, controlling the at least one first electric motor and the at least one second electric motor in accordance with the first, second or third areas so that:
    only one of the at least one first electric motor and the at least one second electric motor is activated; or
    both the at least one first electric motor and the at least one second electric motor are activated.

3. The method of claim 1, wherein:
    below a predefined low driver-requested torque associated with a slow vehicle speed, the determining includes determining the torque distribution to be in the first area so that the operating includes activating the at least one first electric motor but not the at least one second electric motor;
    at a moderate vehicle speed, the determining includes determining the torque distribution to be in the second area so that the operating includes activating the second electric motor but not the at least one first electric motor; and at a high vehicle speed, the determining includes determining the torque distribution to be in the third area so that the operating includes activating the first and the second electric motors.

4. The method of claim 1, wherein above a predefined high driver-requested torque associated with any vehicle speed, the determining includes determining the torque distribution to be in the third area so that the operating includes activating both the at least one first electric motor and the at least one second electric motor.

5. The method of claim 1, wherein the determining includes:
    changing a currently selected area from the plurality of areas to another area of the plurality of areas based on the driver-requested torque and the vehicle speed; and
    depending on the characteristic map, changing the determined torque distribution in accordance with the another area only when a plausibility check of the change to the another area has a result that would improve operation of the vehicle.

6. The method of claim 5, wherein the plausibility check represents a hysteresis of the driver-requested torque of the characteristic map.

7. The method of claim 5, wherein the plausibility check comprises conducting a temporal prediction, using one or more of:
    GPS information regarding an intended route;
    analyzing of a surroundings of the vehicle by recognizing traffic signs, or using ADAS sensors; or
    analyzing vehicle data such as slope sensors or steering angle sensors.

8. The method of claim 5, wherein the plausibility check comprises conducting an efficiency comparison between an efficiency which would result if the torque distribution is changed based on the change to the another area, and an efficiency which would result if the torque distribution remains unchanged.

9. The method of claim 5, wherein the plausibility check accounts for a possible derating of the at least one first electric motor and/or the at least one second electric motor.

10. A vehicle, comprising:
    a drive train;
    a plurality of electric motors including at least one first electric motor and at least one second electric motor;
    a front axle to be driven by the at least one first electric motor and releasably connectable to the drive train;
    a rear axle to be driven by the at least one second electric motor and releasably connectable to the drive train; and
    a control unit configured to:
        determine a torque distribution from a characteristic map that defines at least three areas which include:
            i. a first area in which only the at least one first electric motor is activated in a manner such that the front axle is driven exclusively;
            ii. a second area in which only the at least one second electric motor is activated in a manner such that the rear axle is driven exclusively; and
            iii. a third area in which both the at least one first electric motor and the at least one second electric motor are activated in a manner such that the front axle and the rear axle are driven;
        control the at least one first electric motor and the at least one second electric motor by operating the at least one first electric motor and the at least one second electric motor using the determined torque distribution; and
        disconnect or decouple a non-driven axle of the front axle and the rear axle from a drive train of the vehicle.

11. The method of claim 1, wherein the characteristic map includes boundaries of the at least three areas.

12. The method of claim 11, further comprising implementing at least one transition in response to the torque distribution entering or exiting one of the boundaries by the implementing including one or more of:
- switching one of the at least one first electric motor and the at least one second electric motor on or off;
- coupling or decoupling the at least one first electric motor and the at least one second electric motor to/from the drive train;
- setting the at least one first electric motor and the at least one second electric motor to a predefined, fixed, minimum torque;
- setting the at least one first electric motor and the at least one second electric motor to a new operating torque; or
- changing a gear of a shiftable transmission of the vehicle.

13. A method for operating a vehicle, the method comprising:
- determining, with a control unit, a torque distribution from a characteristic map that defines at least three areas which include:
  - a first area in which only a first electric motor is activated in a manner such that a front axle of the vehicle is driven exclusively;
  - a second area in which only a second electric motor is activated in a manner such that a rear axle of the vehicle is driven exclusively; and
  - a third area in which both the first electric motor and the second electric motor are activated in a manner such that the front axle and the rear axle are driven; and
- operating the first electric motor and the second electric motor using the determined torque distribution.

* * * * *